No. 772,471. PATENTED OCT. 18, 1904.
U. NEHRING.
PROCESS OF FORMING IMAGES.
APPLICATION FILED FEB. 4, 1904.
NO MODEL.
Fig. 1.
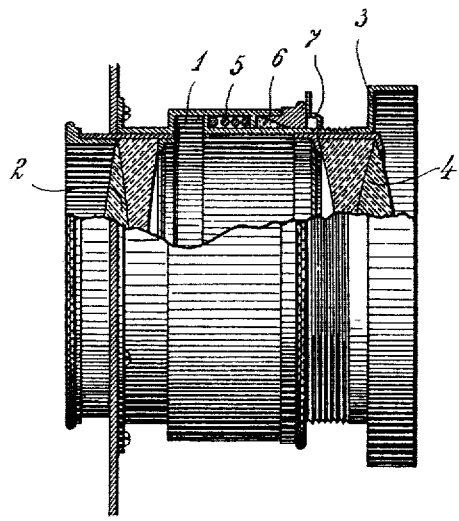
Fig. 2.
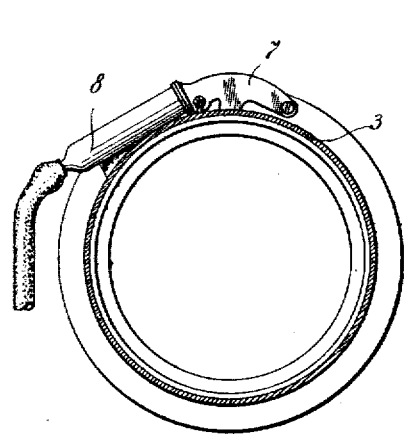
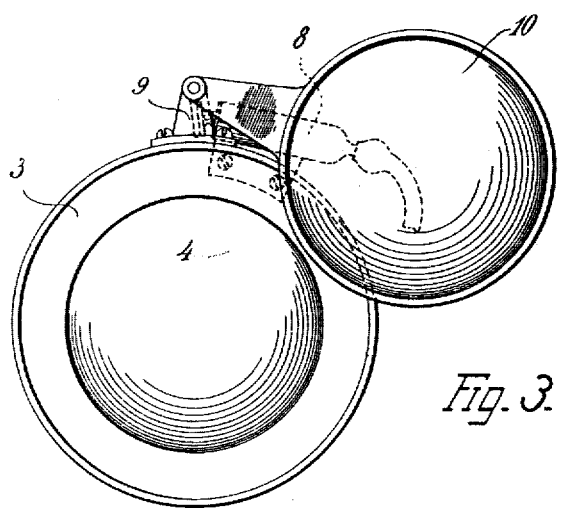
Fig. 3.
WITNESSES:
Max Sidon
Jan Nawradil
ULRICH NEHRING INVENTOR
BY
Dr. Ralph Julian Sachere
ATTORNEY No. 772,471.

Patented October 18, 1904.

UNITED STATES PATENT OFFICE.

ULRICH NEHRING, OF NEW YORK, N. Y.

PROCESS OF FORMING IMAGES.

SPECIFICATION forming part of Letters Patent No. 772,471, dated October 18, 1904.

Application filed February 4, 1904. Serial No. 191,983. (No model.)

*To all whom it may concern:*

Be it known that I, ULRICH NEHRING, a citizen of the United States, residing in New York, in the county of New York and State of New York, have invented new and useful Improvements in Forming Images, of which the following is a specification.

The present invention relates to the correction of certain well-known defects in the use of rays-gathering means, such as spherical or parabolical surfaces or lenses, when used in forming images for photographic or other purposes.

It is known in optics that, for instance, a lens may be regarded as consisting of a series of concentric ring-shaped elements, each having its own focus. The distance of these foci from the optical center of the lens decreases along the optical axis of the lens as the diameter of the lens increases. In the case of spherical lenses or surfaces this fact is known as "spherical aberration." It is also known that the variously-colored rays forming white light are of different wave length and amplitude of vibration, and therefore are of different refrangibility. The violet rays, for instance, being the most refrangible, form a focus nearest to the lens, whereas the red rays, the least refrangible, have their focus farthest from the lens. This deviation of foci is known as "chromatic aberration."

Before attempting to enter into the subject-matter of the present invention it is thought to be advisable to state that the focus of a lens is that point in the optical axis of the lens in which parallel rays meet after emergence and that the focal distance of a lens is the distance between the focus of the lens and the optical center of the lens. The equivalent focus of a lens set or a lens system is that point in the optical axis of the plurality of lenses forming the set or the system in which parallel rays meet after passing all the lenses, and the equivalent focal distance is the distance between the equivalent focus of the lens set or the lens system and the optical center of a theoretical or phantom lens representing the joint action of the plurality of lenses forming the entire system. It is to be noted that in optical vernacular the words "focus" and "focal distance" have become synonymous.

The above-named defects of rays-gathering means become particularly apparent in photography and are the cause of producing images which when acting upon light-sensitive surfaces, such as photographic plates or films, result in pictures having either differently sharp or distorted portions or not showing a true and correct color value of the original object. Attempts have been made to overcome these defects, consisting in varying the distance between the rays-gathering means and the surface upon which the light-rays are proposed to act. It is obvious that such a procedure is not capable of changing the focus or focal distance of the rays-gathering means, but simply moves the focus along the optical axis and leaves the distance of the focus from the optical center of the rays-gathering means undisturbed. A variation, in fact, of the focus of, for instance, a lens can be produced only by varying the degree of refraction of the lens, or, in other words, by changing its optical properties.

The purpose of the present invention is to produce this effect, and it is to be accomplished by either changing the distance between the individual lenses or sets of lenses forming an entire photographic lens or objective or by interpolating an auxiliary lens for this purpose, which in either case causes a change or variation of the focus.

The change of the distance between the lenses of a photographic objective may be brought about by, for instance, holding one of the lenses stationary and moving the other lens during the time of exposure to or from the stationary lens. Another form of arrangement would be the use of a coiled spring between the lenses and properly connected to the casing holding the same and a releasing device for said coiled spring. A third form would be to use a coiled spring outside of one of the lenses and a releasing device which would cause one lens to move relatively to the other during the time of exposure. A fluid-pressure device could also be used for this purpose. In this case a double casing for holding the lenses may be provided containing oil, air, glycerin, &c., or any other fluid in the space between the casings and a device for increasing or decreasing the pressure of this fluid, whereby the distance between the lenses would be varied.

Instead of varying the focus by changing the distance between the lenses, as stated hereinbefore, an auxiliary lens may be provided secured to the front, the rear, or between the lenses of the objective to a point or pivot on the periphery of the lens-casing. This lens by a suitable arrangement may gradually be moved at right angles across and through the optical axis of the objective.

In the drawings, Figure 1 is a side view, partly in section, of a lens accomplishing the object of the present invention by mechanical means. Fig. 2 is a front view of the lens illustrated in Fig. 1, and Fig. 3 is a front view of a lens accomplishing the object of the present invention by optical means.

1 in the drawings is the outer casing or barrel of a lens system, which carries a stationary lens or lens set 2. 3 is the inner casing or barrel, carrying another lens or lens set 4. The inner casing is telescoping the outer casing—i. e., is movable in the axis thereof. In a suitable space between the two casings is an elastic or resilient means 5, which when operating causes a change of the distance between the lenses or lens sets forming the entire system, and consequently causing a change or variation of the focus and a decrease or increase of the focus or the focal distance.

6 is a packing, washer, or stuffing preferably adjustable for preventing any sudden movement of the inner casing 3 in relation to the outer casing 1. This packing may be saturated with oil or glycerin or other suitable substances.

7 is a holding and releasing device operated by the pneumatic cylinder 8, as well known in the art. The release 7 consists of a detent secured to the outer casing 1 and coöperating with teeth provided on the inner casing 3. This device is fully described and claimed in my United States Patent No. 756,881, of April 12, 1904, and covers a mechanical device for changing or varying the focus of rays-gathering means, such as a lens.

An optical device for changing or varying the focus of rays-gathering means is described and claimed in my United States Patent No. 761,390, of May 31, 1904. Fig. 3 of the drawings of the present application is a duplicate of part of the drawings of said United States patent and illustrates one form of such an optical device. 3 is the casing, carrying the lens or lens set 4 and a support 9, to which is pivotally secured an auxiliary lens or lens set 10, controlled by a pneumatic device 8, which causes the auxiliary lens or lens set 10 to move into or out of coöperative relation with the lens or lens set 4.

The practical application of the underlying method of forming images is as follows: An object is focused upon the sensitive surface in the ordinary way. During the time of using the lens system one lens or lens set of the same is caused to move to or from the stationary lens or lens set, or the auxiliary lens herein mentioned is gradually moved across the lenses of the entire lens system. In either case the focus of the system is varied or changed during the time of using the same, and in photography an image can be produced, being evenly sharp and undistorted and lacking the defects due to spherical as well as chromatic aberration.

It is intended to be understood that the hereinafter claimed method of forming images comprises the forming of images for the purposes of photography, as well as for any other purpose, and includes the correcting of spherical aberration as well as of chromatic aberration.

The term "lens" used in the claims refers to any equivalent of a lens, single or compound, such as spherically or otherwise curved, reflecting surfaces or refracting bodies.

What is claimed as new and useful, and desired to be secured by United States Letters Patent, is—

1. The method of forming images which consists in varying or changing during the time of using a lens or lens set, the focus or focal distance of the same.

2. The method of forming images which consists in gradually varying or changing during the time of using a lens or lens set, the focus or focal distance of the same.

3. The method of forming images which consists in varying or changing during the time of using a plurality of lenses or lens sets, the equivalent focus or focal distance of the same.

4. The method of forming images which consists in gradually varying or changing during the time of using a plurality of lenses or lens sets, the equivalent focus or focal distance of the same.

Signed at New York, in the county of New York and State of New York, this 1st day of February, 1904.

ULRICH NEHRING.

In presence of—
 MORRIS RUBENS,
 FREDERICK BRITSCH.